United 3,660,344
Patented May 2, 1972

3,660,344
SELF-EXTINGUISHING POLYAMIDE MOULDING COMPOSITIONS

Dietrich Michael, Kresfeld-Bockum, and Wilfried Kosiol, Moers, Germany, assignors to Farbenfabriken Bayer Aktiengesellschaft, Leverkusen, Germany
No Drawing. Continuation of abandoned application Ser. No. 804,262, Mar. 4, 1969. This application Mar. 29, 1971, Ser. No. 129,206
Int. Cl. C08g 51/10, 51/58
U.S. Cl. 260—37 N                              5 Claims

ABSTRACT OF THE DISCLOSURE

Self-extinguishing polyamide moulding compositions containing as a flame retardant agent melamine, a derivative of melamine or the melamine condensation product melam.

---

This is a continuation of Ser. No. 804,262, filed Mar. 4, 1969, now abandoned.

This invention relates to self-extinguishing polyamide moulding compositions containing melamine or derivatives thereof as fire-retarding additives.

Among the thermoplastic plastics, polyamides are regarded as flame-resistant. If they come into contact with a flame, they burn with a bluish, very dull flame. If the flame by which the polyamide is ignited is removed, it will depend upon the particular conditions prevailing whether the polyamide will be spontaneously extinguished or not. Under the definition of "self-extinguishing" given in ASTM D 635–63, some polyamides are classed as self-extinguishing although they do not satisfy the more stringent requirements of the test specified in UL Subject 94, Group II.

Fibre-reinforced, and in particular glass-fibre-reinforced, polyamides are flammable. Once a test specimen of such a moulding composition is ignited, it will not extinguish on its own. This is true whatever method of testing is employed.

It is known that the flammability of plastics can be reduced by the addition of fire-retarding substances. Unfortunately, substances of this kind cannot be universally used with equal effect in every type of plastic; but instead, each type of plastic has to have its own system. By far the greater majority of fire-retarding additives that have been proposed are halogen-containing compounds, oxygen or sulphur compounds of arsenic, antimony or bismuth, or phosphorus compounds.

The flame resistance of polyamides also can be improved by the addition of, for example, $Sb_2O_3$ or $Sb_2O_5$, optionally in admixture with chlorine compounds. In order, however, to obtain an adequate effect with substances of this kind, they have to be added in such large quantities that the mechanical properties of the polyamides suffer to such an extent that the additives in question cannot be used on a practical scale.

It is much more difficult to improve the flame resistance of injection moulding compositions based on glass-fibre-reinforced polyamides. Quite apart from considerable damage to the mechanical properties, no substantial improvement in flame resistance is obtained with conventional additives, such as compounds of antimony, chlorine and phosphorus.

There has never yet been any evidence of an additive which in every type of polyamide, and, in particular, fibre-reinforced and more particularly glass-fibre-reinforced polyamides, produces an adequate level of self-extinguishing properties as defined, for example, in the specifications ASTM D 635–63, and more strictly in UL Subject 94, Group II, and which causes little or no damage to the mechanical properties of the polyamide material.

It is an object of this invention to provide a polyamide moulding composition which is self-extinguishing according to ASTM D 635–63 and to UL Subject 94, Group II. It is a further object of this invention to provide a fibre-reinforced polyamide moulding composition which is self-extinguishing according to ASTM D 635–63 and to UL Subject 94, Group II.

It is still a further object of this invention to provide a glass-fibre-reinforced polyamide moulding composition which is self-extinguishing according to ASTM D 635–63 and to UL Subject 94, Group II.

It is another object of this invention to provide such polyamide moulding compositions as mentioned above, the mechanical properties of which are not damaged to noteworthy amount.

These objects are accomplished by a self-extinguishing polyamide moulding composition comprising a polyamide having recurring carbonamide linkages in the polymer chain and 0.5 to 25% by weight, based on the moulding composition, of a melamine compound selected from the group consisting of melamine, a melamine derivative and the melamine condensation product melam.

In the context of this invention, self-extinguishing polyamide moulding compositions include those which are classed as self-extinguishing according to ASTM D 635–63 and also according to UL Subject 94, Group II.

In the present context by the expression "a melamine derivative" is meant a derivative of melamine of general Formula I, in which R and R' may be the same or different and represent hydrogen, methyl, ethyl, ethylene, phenyl, toluyl or halogeno-phenyl, for example N,N',N''-triphenylmelamine or N-ethylene melamine. Of the condensation products of melamine, Melam (II) deserves particular emphasis.

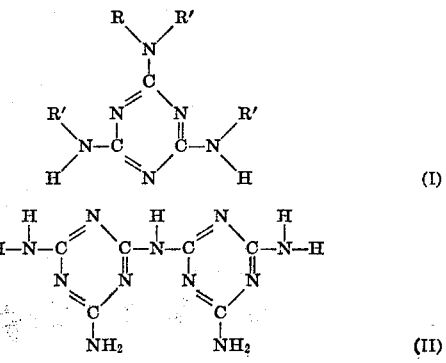

The fire-retarding additives present in the self-extinguishing polyamide moulding compositions according to the invention are added in quantities of from 0.5 to 25% by weight, based on the moulding compositions. Non-fibre-reinforced polyamide moulding compositions preferably contain from 1.5 to 7.0% by weight and the fibre-reinforced polyamide moulding compositions preferably contain from 5.0 to 12.5% by weight of the aforementioned additives. It is possible in this way to obtain a level of flame resistance or self-extinguishing behaviour which satisfies the requirements laid down in ASTM D 635-63 and UL Subject 94, Group II. Accordingly, the resulting moulding compositions are classed as self-extinguishing under ASTM D 634-63 and as self-extinguishing under UL Subject 94, Group II.

In some instances, these additives show no effect, and in other instances little effect, on the mechanical properties of the moulding compositions. For example, notch impact strength, which as a rule is the property most seriously affected by pigment-like additives, is unaffected by the quantity in which the additive is used. The value determined on the polyamide before addition of the flame retardant agent remains unaffected.

In the context of this invention, polyamide moulding compositions include moulding compositions in any form, for example, finely-divided, bead-like, cylindrical granulates, or irregular lumps of the kind formed during grinding. Advantageously the particles have diameters of from 0.5 to 5 mm. and lengths of from 1 to 2 mm. In addition to the additive used in accordance with the invention, the moulding compositions may also contain other conventional additives, such as fillers, dyes and pigments, lubricants, plasticisers, anti-static agents, stabilizers or foam-forming compounds.

Polyamides suitable for use in the production of the moulding compositions include any polyamides of the kind that can be obtained by polymerising lactams or by polycondensing aminocarboxylic acids or the salts of diamines and dicarboxylic acids, or by polycondensing diamines with dicarboxylic acid derivatives, i.e. polyamides having recurring carbonamide linkages in the polymer chain. It is preferred to use polyamides with a molecular weight in the range from 5000 to 60,000 (corresponding to a relative solution viscosity $\eta_{rel}$ as measured on a solution of 1 g. of polymer in 100 ml. of m-cresol at 20° C. in an Ubbelohde viscosimeter of from 1.25 to 7.0).

It has proved to be of particular advantage to use melamine, its derivatives and condensation products for fibre-reinforced polyamide moulding compositions, in which no fire-retarding effect has ever previously been obtained, and particularly for glass-fibre-reinforced polyamide moulding compositions. The fibre-reinforced polyamide moulding composition may contain as fibre material, for example, fibres of cotton, sisal, asbestos, synthetic fibres, metal fibres or, in particular, glass fibres. The fibres may form up to 80% by weight of the polyamide moulding composition.

It may be regarded as extremely surprising that the addition of melamine, or derivatives or condensation products thereof to polyamide moulding compositions produces such an outstanding fire-retarding effect without any change in the mechanical properties.

The test defined in ASTM D 635-63 is conducted as follows: Test specimens with the following dimensions 127 mm. x 12.7 mm. x ≤2.54 mm., preferably 127 mm. x 12.7 mm. x 6.35 mm. which are held in a device in such a way that their longitudinal axes are horizontal and their transverse axes are inclined at an angle of 45°, are ignited at their free end with a Bunsen flame. The Bunsen burner has a tube diameter of 10 mm. and the blue flame thereof has a height of approximately 25 mm.

Ignition is continued for 30 seconds with the tip of the flame touching the lower end of the test specimen. If the test specimen does not continue to burn after the first ignition, it has to be exposed to a flame for another 30 seconds immediately after going out. If the flame goes out before reaching a reference mark located at a distance of 101.6 mm. from the end at which the test specimen is ignited, the material from which it is made is classed as self-extinguishing.

The test defined in UL Subject 94, Group II, is conducted as follows:

(UL test: Underwriters' Laboratories Incorporated, a non-profit making organisation, sponsored by American Insurance Association, Testing for Public Safety, 207 E. Ohio Street, Chicago 11, Ill., U.S.A. Test specifications and results published in: "Bulletin of Research" for the present purpose: Specification dated Sept. 12, 1959, Subject 94: Burning Test of Plastics.)

Test specimens with the following dimensions 153.4 mm. x 12.7 mm. x 6.35 mm. and 153.4 mm. x 12.7 mm. x 1.59 mm. are tested directly after injection following ageing for 7 days at 770° C. The specimens are held upright and ignited at their lower end for 10 seconds with a 19 mm. tall blue Bunsen flame without any cone. If the period for which the test specimen continues to burn following removal of the flame is less than 30 seconds, the test specimen is ignited for another 10 seconds.

If the afterburn time is on average less than 25 seconds for each ignition, and if that part of the test specimen projecting from the clamp has not been burnt over its entire length, the material is classed as self-extinguishing under UL Subject 94, Group II.

The following examples are to further illustrate the invention without limiting it.

The parts and percentages indicated in the examples are parts and percentages by weight.

EXAMPLE 1

5 parts of melamine are homogeneously mixed in an extruder with 95 parts of polyamide-6 having a relative solution viscosity of 3.1 (as measured on a 1% by weight solution of 1 g. of polyamide in 100 ml. of m-cresol at 20° C.). The strand protruding from the extuder is allowed to cool and then granulated, dried and injection-moulded into test specimens with the following dimensions:

(1) 127 mm. x 12.7 mm. x 6.35 mm.

and (2) 127 mm. x 12.7 mm. x 1.59 mm.

The polyamide thus obtained has a notched impact strength of 4.5 cm. kg./cm.$^2$.

The corresponding test specimens were tested for their flame resistance in accordance with the specification laid down in ASTM D 635-63 and UL Subject 94, Group II.

According to these specifications, the material is classed as self-extinguishing both under ASTM D 635-63 and also under UL Subject 94, Group II.

In order to illustrate the effect of the additives, the average afterburn times of the moulding composition are set out in Table 1. The afterburn time is the period during which the flame on the test specimen continues to burn, following removal of the flame, until it extinguishes. This time may be regarded as a measure of the effectiveness of the additive. Untreated moulding compositions burn away following removal from the flame.

This period is determined in conjunction with the test stipulated in ASTM D 635-63. The test specimens are initially ignited for 30 seconds and, if they go out, for another 30 seconds. The periods for which the test specimens continued to burn until they go out following removal of the flame are used to determine the afterburn time.

EXAMPLE 2

63.7 parts of polyamide-6 having a relative solution viscosity $\eta_{rel}$ of 3.1 (as measured on a solution of 1 g.

of polyamide in 100 ml. of m-cresol at 20° C.), 9 parts of melamine and 27.3 parts of glass-fibres are processed in an extruder as described in Example 1. Instead of the 63.7 parts of polyamide-6 and 27.3 parts of glass fibres, it is also possible to use 91 parts of glass fibre reinforced polyamide-6 with a glass fibre content of 30%.

The results of the flame test are set out in Table 1.

EXAMPLE 3

73.6 parts of polyamide-6 having a relative solution viscosity $\eta_{rel.}$ of 3.1 (as measured on a solution of 1 g. of polyamide in 100 ml. of m-cresol at 20° C.), 8 parts of melamine and 18.4 parts of asbestos fibres (Krokydolith) are extruded as in Example 1, injection-moulded and then tested. The test results are set out in Table 1.

EXAMPLE 4

65.6 parts of polyamide-6,6 having a relative solution viscosity $\eta_{rel.}$ of 2.93 (as measured on a solution of 1 g. of polyamide in 100 ml. of m-cresol at 20° C.), 27.3 parts of glass fibres and 7.1 parts of melamine are extruded as in Example 1, injection-moulded and tested. The test results are set out in Table 1.

EXAMPLE 5

63.7 parts of polyamide-6 and 27.3 parts of glass fibres are processed as in Example 2, except that N,N′,N″-triphenyl melamine is used as additive instead of melamine in a quantity of 5.8 parts.

After injection-moulding, testing shows that in this case too (cf. Table 1) as in all the preceding examples, the moulding composition is self-extinguishing according to ASTM D 635–63 and UL Subject 94, Group II.

Comparison-tests

Polyamide-6
(a) without any reinforcing fibres,
(b) with a 30% glass fibre content, and
(c) with a 20% asbestos fibre content was used for comparison in each case without any additive according to the invention.

(d) polyamide-6,6 with a glass fibre content of 29.4% was also used for comparison, again without the additive according to the invention.

The results are also set out in Table 1.

TABLE 1

| Type of specimen | Self-extinguishing according to— ASTM D 635-63 | Self-extinguishing according to— UL Subject 94 Group II | Average afterburn time in sec. (as determined in accordance with ASTM D 635-63) | Notched impact strength, cm.kg./cm.² |
|---|---|---|---|---|
| Comparison test (a) polyamide-6 (no additive) | Yes | No | | 4.3 |
| Example 1, 95.0 parts of polyamide-6 5.0 parts of melamine | Yes | Yes | 1.8 | 4.5 |
| Comparison test (b) Polyamide-6 with 30% glass fibre content (no additive) | No | No | (¹) | 7.7 |
| Example 2, 63.7 parts of polyamide-6, 27.3 parts of glass fibres, 9.0 parts melamine | Yes | Yes | 6.7 | 7.5 |
| Example 5, 63.7 parts of polyamide-6, 27.3 parts glass fibres, 5.8 parts of N,N′,N″-triphenyl-melamine | Yes | Yes | 12.8 | |
| Comparison test (c) polyamide-6 with 20% asbestos fibre content (no additives) | No | No | (¹) | |
| Example 3, 73.6 parts of polyamide-6, 18.4 parts asbestos fibres, 8.0 parts of melamine | Yes | Yes | 13.2 | |
| Comparison test (d) polyamide-6,6 with 29.4% glass fibre content (no additives) | Yes | No | (¹) | |
| Example 4, 65.6 parts polyamide-6,6, 27.3 parts glass fibres, 7.1 parts melamine | Yes | Yes | 3.1 | |

¹ Test specimen burns off after ignition.

We claim:
1. A self-extinguishing polyamide moulding composition comprising a polyamide having recurring carbonamide linkages in the polymer chain and 0.5 to 25% by weight based on the moulding composition, of a melamine compound selected from the group consisting of melamine, melam, and a melamine derivative containing at least one N substituent and having the formula

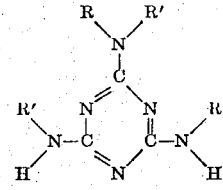

in which R and R′ are the same or different and represent hydrogen, methyl, ethyl, ethylene, phenyl, toluyl or halogenophenyl.

2. The composition of claim 1 which contains from about 18 to about 27% by weight based on the moulding composition of a fiber material.

3. The composition of claim 2 in which the fiber is glass fiber.

4. A self-extinguished polyamide moulding composition of claim 1 wherein said moulding composition contains up to 80% by weight, based on the moulding composition of a fiber material.

5. A self-extinguished polyamide moulding composition of claim 4 said fiber material being a glass fiber material.

References Cited

UNITED STATES PATENTS

| 3,084,135 | 4/1963 | Scullin | 260—41 |
| 3,270,016 | 8/1966 | Dunnenberger | 260—248 |
| 3,379,676 | 4/1968 | Ashton | 260—45.8 |
| 3,496,136 | 2/1970 | Susi | 260—45.8 |

FOREIGN PATENTS

| 991,159 | 5/1965 | Great Britain. |
| 1,191,569 | 4/1968 | Germany. |

MORRIS LIEBMAN, Primary Examiner

R. ZAITLEN, Assistant Examiner

U.S. Cl. X.R.

160—15 FP; 260—45.8 N

UNITED STATES PATENT OFFICE
CERTIFICATE OF CORRECTION

Patent No. 3,660,344　　　　　　　　Dated May 2, 1972

Inventor(s) Dietrich Michael and Wilfried Kosiol

It is certified that error appears in the above-identified patent and that said Letters Patent are hereby corrected as shown below:

| Column | Line | Error |
|--------|------|-------|
| 3 | 33 | "plasticisers" should be ---plasticizers--- |
| 3 | 37 | "polymerising" should be ---polymerizing--- |
| 4 | 19 | "ageing" should be ---aging---; "770°" should be ---70°--- |

Signed and sealed this 29th day of October 1974.

(SEAL)
Attest:

McCOY M. GIBSON JR.
Attesting Officer

C. MARSHALL DANN
Commissioner of Patents